July 4, 1950         R. J. BROWN, JR         2,514,177
ARTIFICIAL FLOWER ATTACHMENT
Filed June 8, 1948
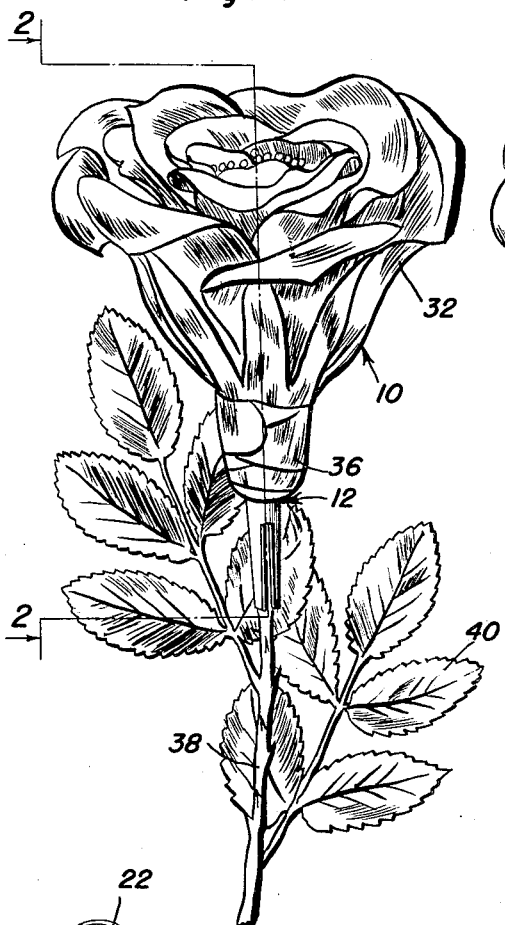
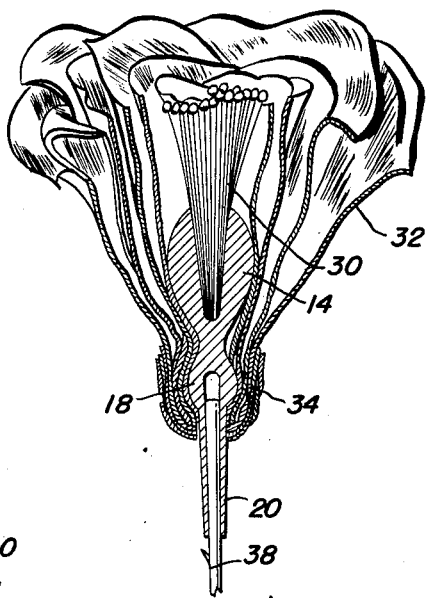
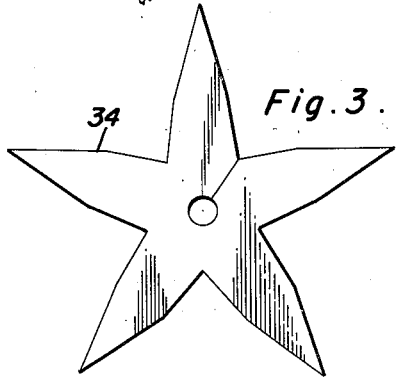
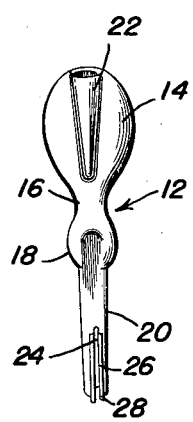
Robert J. Brown, Jr.
INVENTOR.

UNITED STATES PATENT OFFICE 2,514,177

ARTIFICIAL FLOWER ATTACHMENT

Robert J. Brown, Jr., Norfolk, Va.

Application June 8, 1948, Serial No. 31,700

2 Claims. (Cl. 41—13)

This invention relates to a holder and the primary object of the invention is to provide means for mounting artificial flowers on living foliage so that it will simulate blooming flowers as closely as possible.

Another object of the invention is to provide means to retain the component parts of an artificial flower together in a realistic manner for placement upon suitable living foliage.

Another object of the invention is to provide a holder containing means therein for mounting the petals, stamen or pistils of a flower therein, the holder itself acting as the ovary and being mounted on a living stem.

And yet another object of the invention is to provide a device that is simple in nature, durable in construction, economical in cost, and efficient for the intended purpose.

In addition to the above, this invention comprehends improvements in details of construction and arrangement of parts to be hereinafter described and set forth in the claims.

In the following drawings, in which similar and corresponding parts are designated by reference characters throughout in the several views:

Figure 1 is a perspective view of the holder with an artificial flower secured thereon;

Figure 2 is a vertical sectional view of the holder and is taken substantially on the broken line 2—2;

Figure 3 is an elevation of the calyx of a flower;

Figure 4 is an elevation of a petal for the flower; and

Figure 5 is a perspective view of the flower holding means.

While a great deal of effort is made to enhance the appearance of a home externally by the use of flowers and shrubbery, the actual period in which flowers bloom is very short and, as a result, the foliage is bare during a greater part of the year. In order to simulate blooming flowers in their natural environment, the holder of the invention has been devised for mounting artificial flowers directly on living foliage.

Referring to the figures, a flower 10, and particularly a rose, is illustrated as mounted on the holder of the invention 12 (Figure 5).

Holder 12 is constructed of a unitary material, which may be plastic, Celluloid, rubber, or any other elastic material suitable for the intended purpose. Holder 12 is of unitary construction and includes a bulbous head member 14 forming a restricted neck 16 and connecting with a smaller bulbous ovary 18. An elongated stem 20, in turn, depends from ovary 18. Head 14 is bored axially to form an elongated tapering slot 22. Shank or stem member 20 is also bored along the axial length thereof and terminates at a point adjacent ovary 18. Shank 20 is slotted at 26 from the outer end thereof to a point intermediate the length thereof. Arcuate guide ears 28 are integral with the open edges of slot 26.

When in use, holder 12 retains in cup-like slots 22 stamens or pistils 30. Flower petals 32 are then placed circumferentially around the holder, and are flared outwardly in a usual manner. Calyx 34 is then mounted around petals 32 adjacent the ovary 18, and a suitable retaining strip 36 secures the flower on the holder. A stem 38, including leaves 40, of live foliage receives slit shank member 20, flanges 28 serving as guiding means for the insertion thereof. The split construction of shank 20 permits holder 12 to spread slightly and thereby securely grip the free ends of flower stem 38. Foliage 38 will be actually growing shrubbery, upon which the artificial flower may be mounted, or it may have been cut for decoration in the home, it being possible to thus simulate blooming flowers at all times of the year.

Obviously, the holder is not limited to the flower depicted in the drawings and may be used to construct gardenias, camillias, or any other suitable flower, the basic idea of the invention being to mount suitable artificial flowers on appropriate shrubbery to simulate natural flowers in bloom. It is to be understood that cups 22 may be used to retain certain types of flowers and an extremely realistic appearance is obtained in mounting the flower on living foliage.

From the above, it will be seen that the several objects of the invention are attained and other advantageous results achieved.

As many modifications of the embodiments above illustrated might be made without departing from the spirit or scope of the invention, it is intended that the above description and accompanying drawings and claims shall be interpreted as illustrative and not in a limiting sense.

Having described the invention, what is claimed as new is:

1. An artificial flower comprising a bulbous body member having an axially disposed tapered bore in its upper end, stamens inserted in said bore and extending above the body member, a smaller bulbous ovary depending from said member, petals embracing said ovary and encircling said stamens, a calyx embracing said petals, means wrapped around the ovary for securing the petals and calyx thereon and a stem depending from said ovary, means for securing the stem on a branch or stem of a bush.

2. An artificial flower comprising a bulbous body member having an axially disposed tapered bore in its upper end, stamens inserted in said bore and extending above the body member, a smaller bulbous ovary depending from said member, petals embracing said ovary and encircling said stamens, a calyx embracing said petals, means wrapped around the ovary for securing the petals and calyx thereon and a stem depending from said ovary, a centrally disposed vertical bore in said stem, a slot formed vertically in the lower end of the stem defining opposing branches and guide means associated with said branches, said stem being adapted to be inserted on a stem.

ROBERT J. BROWN, Jr.

REFERENCES CITED

The following references are of record in the file of this patent:

UNITED STATES PATENTS

| Number | Name | Date |
|---|---|---|
| D. 140,479 | Lane | Feb. 27, 1945 |
| 497,407 | Fishel | May 16, 1893 |
| 1,715,461 | Loeben | June 4, 1929 |

FOREIGN PATENTS

| Number | Country | Date |
|---|---|---|
| 525,644 | France | June 14, 1921 |